E. C. SELLERS.
HARVESTER REEL.
APPLICATION FILED OCT. 22, 1918.
1,301,512. Patented Apr. 22, 1919.
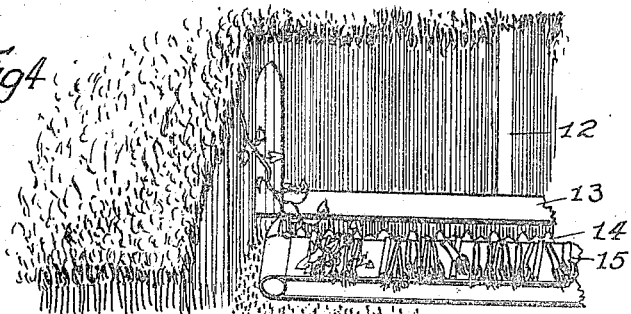
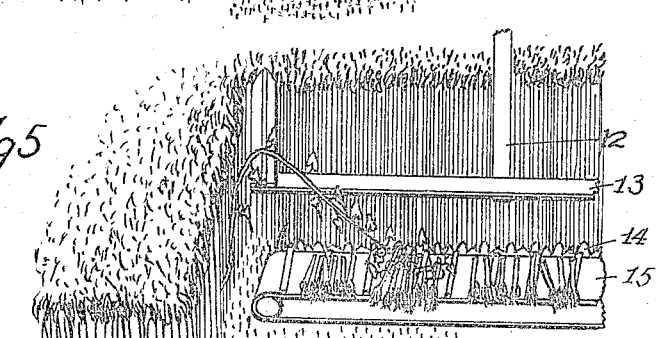
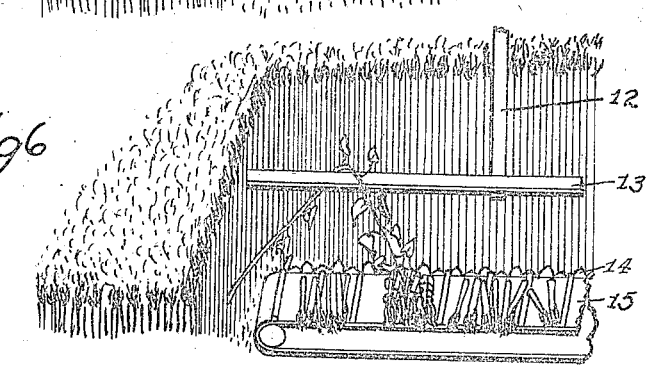
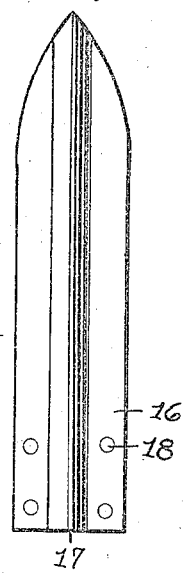
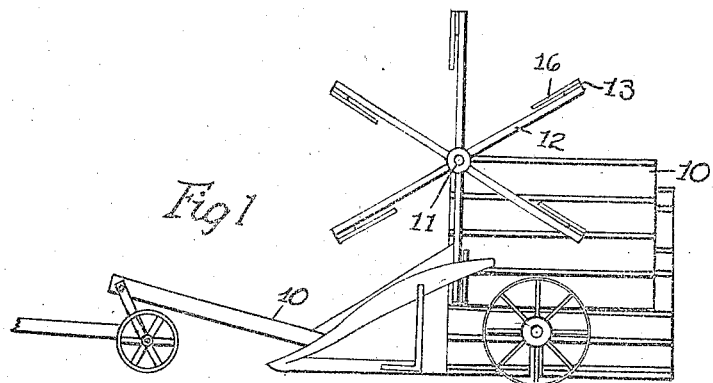
Witness
Inventor
Edward C. Sellers

UNITED STATES PATENT OFFICE.

EDWARD C. SELLERS, OF GREEN MOUNTAIN, IOWA.

HARVESTER-REEL.

1,301,512.     Specification of Letters Patent.     Patented Apr. 22, 1919.

Application filed October 22, 1918. Serial No. 259,271.

*To all whom it may concern:*

Be it known that I, EDWARD C. SELLERS, a citizen of the United States, and resident of Green Mountain, in the county of Marshall and State of Iowa, have invented a certain new and useful Improvement in Harvester-Reels, of which the following is a specification.

The object of my invention is to provide a device of simple, durable and inexpensive construction, especially designed to be attached to harvester reels of the ordinary kind, for the purpose of preventing the reel from becoming entangled in the "down" grain or in weeds or vines growing with and entwined about the standing grain being harvested.

My invention consists in the construction of the attachment and its arrangement in combination with a harvester reel, whereby the objects contemplated are attained, as hereinafter more fully set forth, pointed out in my claims, and illustrated in the accompanying drawings, in which:

Figure 1 shows a side elevation of a harvester having my improvement applied to the reel thereof.

Fig. 2 shows a front view of the reel protecting blade.

Fig. 3 shows an end view of same.

Fig. 4 shows a perspective view illustrating a part of a harvester conveyer and cutter bar and a portion of a reel adjacent thereto, with the arm of the reel in a vertical position or at its lower limit of movement. In said view there is also illustrated the standing grain in front of the cutter bar and at the side thereof, and the cut grain under the conveyer; also a vine extending from the standing grain and caught or entangled about the cut grain on the conveyer.

Fig. 5 shows a similar view illustrating the manner in which my improvement prevents the entangled vine or weed from becoming wrapped about the reel, and in this view the reel is shown moved rearwardly a slight distance beyond that in which it is illustrated in Fig. 4; and Fig. 6 shows a similar view illustrating the manner in which vines and weeds become caught or entangled on the harvester reel when my improvement is not used.

Referring to the accompanying drawings, I have used the reference numeral 10 to indicate a harvester having a reel shaft 11 and radial reel arms 12 provided with horizontally arranged reel blades 13. As these reels are ordinarily constructed, the arms 12 stand spaced apart from the ends of the reel blades 13 a considerable distance as shown in Fig. 6. The mower cutter bar illustrated in Figs. 4 and 5 is indicated by the numeral 14, and the grain conveyer by the numeral 15.

My improved attachment comprises a sheet metal blade having a body portion 16 with a reinforcing arched rib 17 at its longitudinal center, and provided with openings 18 to receive screws by which it may be connected to the end portion of the reel blade 13. It is arranged in this position flat against the face of the reel blade and extended inwardly toward the reel shaft 11. The length of this blade is such that when attached to the reel, and the reel blade to which it is attached is at its lowermost position, the upper or pointed end of the protecting blade 16 will extend slightly above any grain, weeds or vines that may be found in the field being mowed.

In practical operation, it frequently occurs that the grain will be "down", or weeds and vines are entwined through the standing grain. Under these conditions and with an ordinary reel not provided with my improvement, it sometimes happens that the reel blade 13 will, during its movement, pass under the "down" grain or the weeds or vines, which thereupon become entwined about the ends of the reel blades that project beyond the reel arms 12, as illustrated in Fig. 6. This soon clogs the reel and prevents its effective operation, and the driver must frequently stop and remove same by hand.

With my improvement applied to the reel blades, it will be seen that, as illustrated in Fig. 4, the protecting blades will engage the "down" grain or the weeds or vines, and as the reel progresses to the position shown in Fig. 5 it will move them outwardly and away from the reel and prevent them from becoming caught or entangled about the reel blade.

The device is very simple and inexpensive and may be used as an attachment to be applied to the ordinary reels now in general use.

I claim as my invention:

1. The combination with a harvester reel comprising a reel shaft, arms extending radially therefrom, and reel blades secured to the ends of said arms, intermediate of the ends of said blades, of a protecting blade secured to the outer end of each reel blade and extended toward and disposed radially relative to said shaft.

2. The combination with a harvester reel comprising a reel shaft, arms extending radially therefrom, and reel blades secured to the ends of said arms, intermediate of the ends of said blades, of a protecting sheet metal blade formed with a reinforcing, longitudinal, central rib, said blade being secured to the outer end of each reel blade and extended toward and disposed radially relative to said shaft.

Des Moines, Iowa, August 10, 1918.

EDWARD C. SELLERS.